(No Model.)
C. H. HAGLER.
KITCHEN CABINET.
No. 488,807. Patented Dec. 27, 1892.
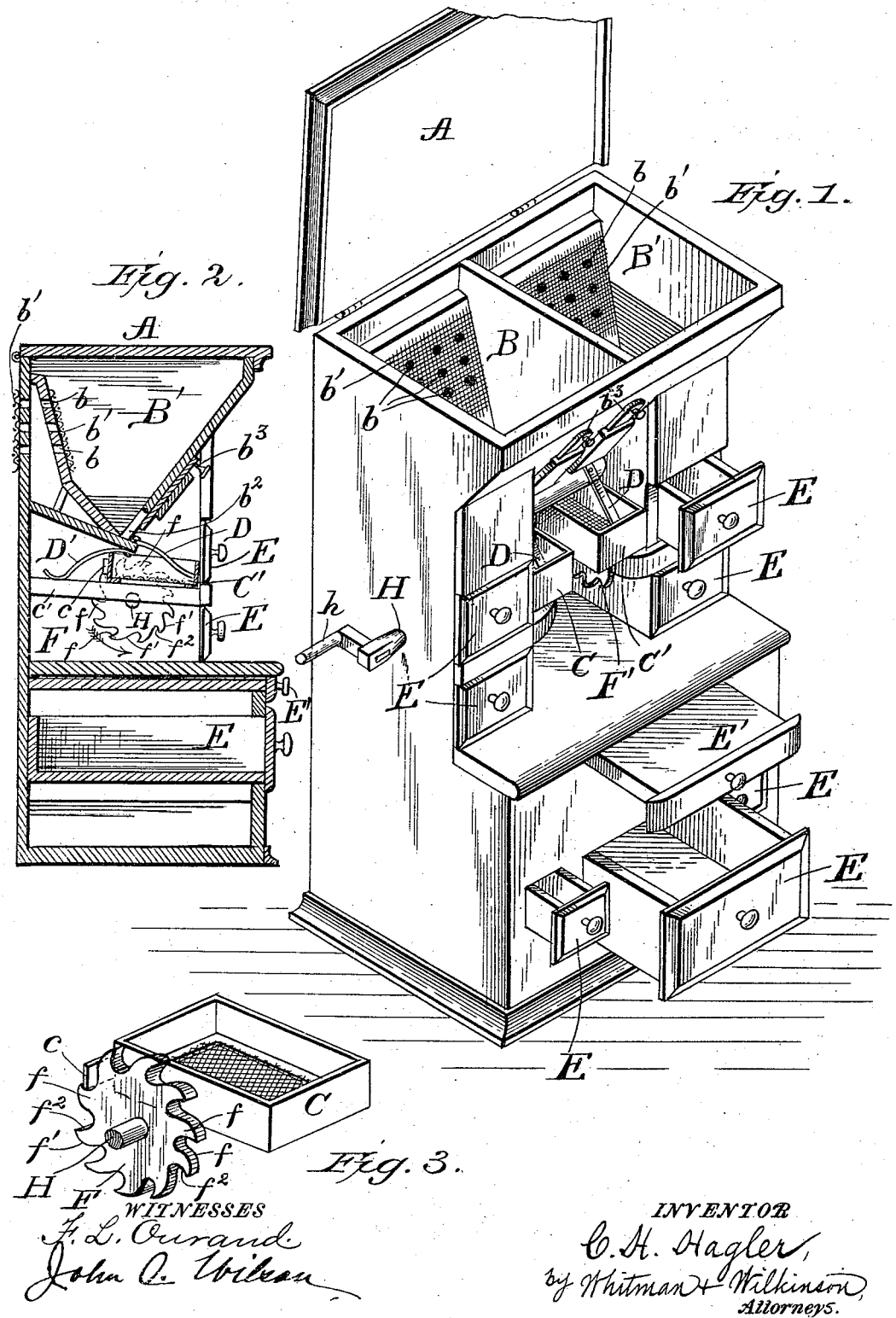
WITNESSES
F. L. Ourand
John O. Wilson
INVENTOR
C. H. Hagler,
by Whitman & Wilkinson
Attorneys.

UNITED STATES PATENT OFFICE.

CHARLES H. HAGLER, OF HACKETT, ARKANSAS.

KITCHEN-CABINET.

SPECIFICATION forming part of Letters Patent No. 488,807, dated December 27, 1892.

Application filed August 4, 1892. Serial No. 442,197. (No model.)

*To all whom it may concern:*

Be it known that I, CHARLES H. HAGLER, a citizen of the United States, residing at Hackett, in the county of Sebastian and State of Arkansas, have invented certain new and useful Improvements in Kitchen-Cabinets; and I do hereby declare the following to be a full, clear, and exact description of the invention, such as will enable others skilled in the art to which it appertains to make and use the same.

My invention relates to improvements in kitchen cabinets, and it consists, of certain novel features hereinafter described and claimed.

Reference is had to the accompanying drawings, wherein the same parts are indicated by the same letters.

Figure 1 represents a perspective view of a kitchen cabinet, containing my invention. Fig. 2 represents a section of the same on a reduced scale, the said section being taken through one of the vibrating sifters. Fig. 3 represents a perspective view of one of the sifters, and of the cogged wheel for moving the same backward or for pushing it out.

A represents the lid of the cabinet, which normally covers the bins B and B' designed to hold flour and meal. Each of these bins has air holes $b$ covered with gauze $b'$, for the purpose of aerating the meal or flour.

Apertures $b^2$, and sliding doors $b^3$ at the bottom of the bins, allow the meal and flour to drop into the sifters C and C', respectively. These sifters are adapted to move backward and forward on slides $c'$ secured to the body of the cabinet, and at the side of each sifter a projecting plate or stud $c$ is adapted to engage the cogs $f$ of a cogged wheel F or F'.

A spring D secured to the cabinet, passes into the end of the sifter, and a curved spring D' bears against the top of the rear portion of the sifter, as shown in Fig. 2. The cogged wheel F, or F', has cogs $f$ with one edge $f'$ sloping, and the other edge $f^2$ radial or hook-shaped. These cogged wheels are mounted upon the shafts H and H' respectively, each of which has its appropriate handle $h$. But one handle is shown in the drawings.

E E &c. represent drawers adapted to contain the various articles required for kitchen use, and E' represents a dough board.

The operation of the device is as follows:—The flour and meal being placed in their respective bins, the desired amount is drawn into, say, the sifter C', by means of the sliding doors $b^3$; the cogged wheel F' is then revolved in the direction of the arrow in Fig. 2, and the sloping backs $f'$ of the teeth $f$, will wedge under and lift the studs $c$, and with it the rear end of the sifter, at the same time the sifter will be pushed backward somewhat against the springs D and D'. The latter spring D' will also prevent the rear end of the sifter from being thrown upward too violently. In this manner the sifter will be given simultaneously a slight vertical and horizontal reciprocating motion, and the flour or meal will be speedily sifted. When only the husks remain, by turning the wheel F' in a direction opposite to that of the arrow in Fig. 2, the hook-shaped sides of the teeth, will catch on the studs $c$, and about half a turn of the wheel will be sufficient to force the sifter out into such a position that it may be readily removed by hand. The husks may be then dumped out, and the empty sifter returned to its place. In order to do this it is necessary to raise the spring D temporarily, which may be readily done by hand. It will be seen by an inspection of Fig. 2, that the sifter will be held securely between the springs D and D' without any tendency to slip too far forward and upset. The air passages $b$ will admit air enough to prevent the flour or meal from becoming musty under ordinary conditions.

Having thus described my invention, what I claim, and desire to secure by Letters Patent of the United States, is:—

In a kitchen cabinet of the character described, the combination with a plurality of bins each having an aperture in the bottom thereof with means for closing the same, of a removable sifter beneath each bin, the said sifter having a stud protruding from the side thereof; a cogged wheel having teeth sloping at one side and hooked at the other engaging said stud, by means of which cogged wheel the sifter may be reciprocated when turned in one direction, and be forced out for cleaning when turned in the opposite direction; a spring engaging the forward end of said sifter, and a bent spring bearing down on the rear end thereof, the said springs being secured to the said bin and operating conjointly with the said cogged wheel to impart a reciprocation motion to said sifter, substantially as and for the purposes described.

In testimony whereof I affix my signature, by mark, in presence of two witnesses.

CHARLES H. $\overset{\text{his}}{\times}$ HAGLER.
mark

Witnesses:
W. E. JOHNSON,
J. P. McLARTY.